United States Defensive Publication [19] (H) [11] T105,601

Clark [43] Jul. 2, 1985

[54] TUBESHEET IN A SEPARATORY DEVICE CURED USING RADIO WAVES

[76] Inventor: George B. Clark, 175 Mount Vernon Dr., Clayton, Calif. 94517

[21] Appl. No.: 520,107

[22] Filed: Aug. 3, 1983

Related U.S. Application Data

[63] Continuation of Ser. No. 349,223, Feb. 15, 1982, abandoned, which is a continuation-in-part of Ser. No. 165,588, Jul. 3, 1980, abandoned.

[51] Int. Cl.[3] ..... B29F 3/08

[52] U.S. Cl. ..... 264/25; 210/321.1; 210/323.2; 264/26

[57] ABSTRACT

The described invention is directed to a process for curing a tubesheet intended for use in a separatory device. In its broadest sense, the invention is the process for curing a thermoset resin tubesheet intended for a separatory device. This process comprises mixing with the uncured thermoset resin an electromagnetic susceptor which is capable of generating heat when exposed to radio frequency electromagnetic radiation. The thermoset resin containing the electromagnetic susceptor is applied to a segment of a bundle of hollow fibers so as to form a tubesheet when cured. The mixture formed is subjected to electromagnetic radiation for a time sufficient to cure the resin. The invention is further directed to a tubesheet in a separatory device containing a plurality of hollow fibers, said tubesheet comprising a cured thermoset resin containing an electromagnetic susceptor.

9 Claims, No Sheets Drawing,

11 Pages Specification

The file of this unexamined application may be inspected and copies thereof may be purchased (849 O.G. 1221, Apr. 9, 1968).